US012652504B2

(12) United States Patent
Johansson et al.

(10) Patent No.: US 12,652,504 B2
(45) Date of Patent: Jun. 9, 2026

(54) BONE ANCHORED HEARING AID DEVICE UNIT

(71) Applicant: Oticon Medical A/S, Smørum (DK)

(72) Inventors: Martin Johansson, Askim (SE); Johannes Kocher, Askim (SE); Roger Calixto, Vallauris (FR); Lars Vincent Jørgensen, Smørum (DK); Matthias Carlsson, Smørum (DK)

(73) Assignee: OTICON MEDICAL A/S, Smørum (DK)

( * ) Notice: Subject to any disclaimer, the term of this patent is extended or adjusted under 35 U.S.C. 154(b) by 176 days.

(21) Appl. No.: 18/630,044

(22) Filed: Apr. 9, 2024

(65) Prior Publication Data

US 2024/0348997 A1 Oct. 17, 2024

(30) Foreign Application Priority Data

Apr. 13, 2023 (EP) .................................... 23167707

(51) Int. Cl.
*H04R 25/00* (2006.01)

(52) U.S. Cl.
CPC ....... *H04R 25/606* (2013.01); *H04R 2225/67* (2013.01); *H04R 2460/13* (2013.01)

(58) Field of Classification Search
CPC .............. H04R 25/606; H04R 2225/67; H04R 2460/13
See application file for complete search history.

(56) References Cited

U.S. PATENT DOCUMENTS

| | | | | |
|---|---|---|---|---|
| 5,363,444 A * | 11/1994 | Norris | H04M 1/05 | 381/328 |
| 8,837,760 B2 * | 9/2014 | Andersson | H04R 17/00 | 381/328 |
| RE48,797 E * | 10/2021 | Andersson | H04R 25/606 | |
| 2011/0137109 A1 | 6/2011 | Zahnert et al. | | |
| 2018/0279061 A1 * | 9/2018 | Walraevens | H04R 25/606 | |
| 2019/0028819 A1 * | 1/2019 | Vermeiren | H04R 25/606 | |
| 2021/0176574 A1 * | 6/2021 | Bergs | H04R 25/65 | |
| 2022/0286065 A1 | 9/2022 | Naiki | | |

OTHER PUBLICATIONS

Bai Yang et al "Investigation of a cantilever structured piezoelectric energy harvester used for wearable devise with random vibration input", Mechanical systems and signal processing elsevier, Amsterdam, NL, vol. 106, Jan. 12, 2018 (Jan. 12, 2018), pp. 303-318, XP085592590, ISSN: 0888-3270, DOI: 10.1016/J.YMSSP.2018.01.006 *1, first paragraph; 2.1*.

* cited by examiner

*Primary Examiner* — Suhan Ni
(74) *Attorney, Agent, or Firm* — Birch, Stewart, Kolasch & Birch, LLP

(57) ABSTRACT

The disclosure relates to a bone anchored hearing aid device unit including a housing and an actuator having a first plate piezo element, and a clamp system configured for attaching the first plate piezo element to the housing, characterized in that the actuator has a second plate piezo element, in that the clamp system connects the first plate piezo element and the second plate piezo element, via the housing, and in that the clamp system is adapted for transferring, via the housing, a dynamic force between the first plate piezo element and the second plate piezo element. A method of operating a bone anchored hearing device unit is also disclosed.

9 Claims, 4 Drawing Sheets

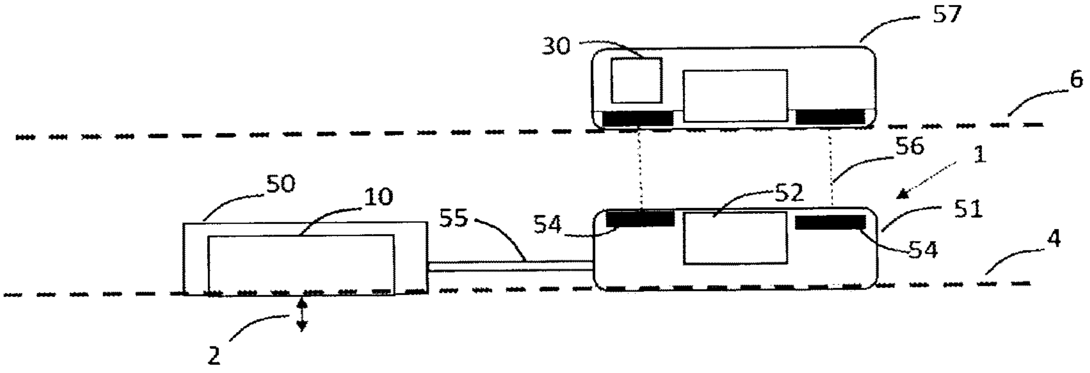
FIG. 1A
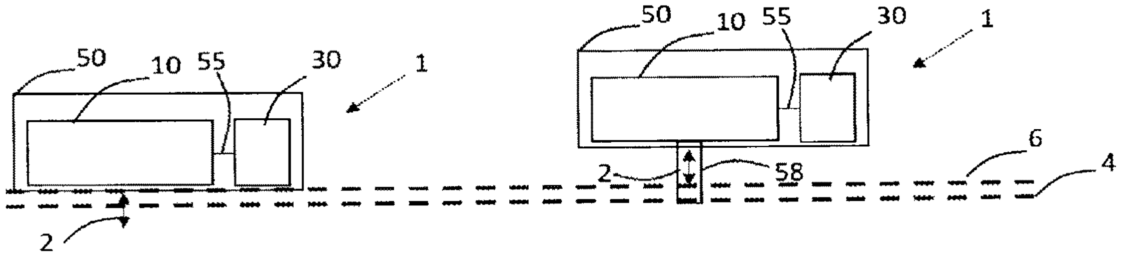
FIG. 1B
FIG. 1C
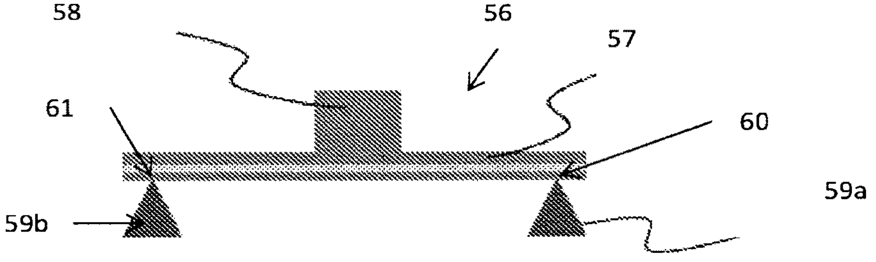
Fig. 2a

BONE ANCHORED HEARING AID DEVICE UNIT

TECHNICAL FIELD

The present disclosure generally relates to a bone anchored hearing aid device unit comprising a housing and an actuator having a first plate piezo element, and a clamp system configured for attaching the first plate piezo element to the housing. The present disclosure further generally relates to a method of operating a bone anchored hearing device unit.

BACKGROUND

Bone anchored hearing aid devices are applied for the rehabilitation of patients suffering from hearing losses for which traditional hearing aids are insufficient.

A typical bone anchored hearing aid device, which is usually called percutaneous bone anchored hearing aid device, comprises an implant unit comprising a skin-penetrating abutment and an external unit provided with a sound processor and an actuator, the actuator being provided to produce a force output, preferably as vibration, and being connected to the abutment through a coupling.

An alternative bone anchored hearing aid device, which is usually called transcutaneous bone anchored hearing aid device, comprises an external unit comprising a sound processor and an implant unit in which an actuator is arranged.

For transcutaneous bone anchored hearing aid devices, it is advantageous to create maximum force output at predetermined frequencies with as little energy transfer over the link through the skin as possible. A problem with optimizing known systems is that there is no reference created for the calibration process. In this context, input from the user is very subjective and cannot be used for calibration.

Also, it is advantageous to optimize the force output at particular frequencies, while minimizing energy transfer over the link through the skin. While trying to optimize these parameters, identifying an optimum is rather problematic, as the input from the user is very subjective and is therefore not adequate as objective reference for the parameter adjustment in general.

Against this background, there is a need to provide a solution that addresses at least some of the above-mentioned problems.

SUMMARY

The object named above is solved in accordance with the present disclosure by a bone anchored hearing aid device unit comprising a housing and an actuator having a first plate piezo element, and a clamp system configured for attaching the first plate piezo element to the housing, characterized in that the actuator has and a second plate piezo element, in that the clamp system connects the first plate piezo element and the second plate piezo element, for example via the housing, and in that the clamp system is adapted for transferring, for example via the housing, a dynamic force between the first plate piezo element and the second plate piezo element.

The object named above is further solved in accordance with the present invention by a method of operating a bone anchored hearing device unit (e.g., a signal processing method), comprising (a) providing a bone anchored hearing aid device unit according to any of the disclosure, (b) feeding a first plate piezo element with a voltage, so that the first plate piezo element produces a dynamic force output; (c) detecting the dynamic force output of the first plate piezo element by means of a second plate piezo element and outputting a voltage signal corresponding to the detected dynamic force output.

When implementing an additional piezo element (e.g., second plate piezo element, third plate piezo element) in the implant, this element can be used to measure the force output of the first plate piezo element creating the force output over frequency. Accordingly, the second plate piezo element allows for calibrating and adjusting the force output of the first plate piezo element, based on the measurement in a signal loop. This can be used either in production, at first activation after implantation or on a daily basis when activating an external sound processor.

In particular, detecting dynamic force output according to the present disclosure allows for calibrating the force output in production or when starting up the device. This can be realized by using the information about the detected force output as an offset over frequency to adjust the signal processing. Furthermore, detecting the force output and performing a signal processing adjustment to this detected force output in real time permits to calculate the exact amount of energy needed by the first plate piezo element for creating the vibration, thus optimizing the energy consumption of the actuator.

In parallel, the second plate piezo element can allow for harvesting (e.g., obtaining, collecting) energy from the vibration or force output of the first plate piezo element. As the harvested energy has been harvested from the force output of the first plate piezo element, it has a resonance frequency adapted for feeding the first plate piezo element. Alternatively of additionally, the harvested energy can be used to supply the electric system of the bone anchored hearing aid device unit in general with energy.

It is to be mentioned that the bone anchored hearing aid device unit can be the external unit of the bone anchored hearing aid device, which external unit may be in general called “sound processor”, and/or a subcutaneous implanted unit of the bone anchored hearing aid device.

The actuator has a first plate piezo element and a second plate piezo element. A plate piezo element in the meaning of the present disclosure has a plate and a counterweight, wherein the plate has a free moving length portion, and wherein the counterweight is arranged at a side of the plate in the free moving length portion of the plate piezo element. The free moving length portion can be a free length of the plate when the plate is in contact with the clamp system at a single clamp position or, alternatively, a portion of the plate comprised between portions of the plate in contact with the clamp system. The plate may be in contact with the clamp system at peripheral zones of the plate, and/or at a central zone of the plate. The counterweight may be arranged off-centered or centered on one side of the plate. Alternatively or additionally, a second counterweight can be provided and arranged on a second side of the plate, wherein the second counterweight is be arranged off-centered or centered on the second side of the plate.

The first plate piezo element and the second plate piezo element may be provided with similar dimension, shape and/or material properties, or with differing dimension, shape and/or material properties.

The second plate piezo element is configured to detect the force output of the first plate piezo element for optimizing a signal processing, and/or to harvested energy from the force output of the first plate piezo element at high frequencies.

A contact of the clamp system with the second plate piezo element may be direct or indirect. In the latter case, the indirect contact can be realized by the clamp system being attached to the housing, and the housing being attached to the second plate piezo element.

When using an actuator with one plate piezo element, i.e., having one vibrator source for generating vibration or sound excitation, usually one resonance peak can be achieved through the design of the source. However, if multiple plate piezo elements are used multiple resonance peaks can be generated, resulting in a wider frequency range with high output and high-power efficiency. Due to the size constraints of a bone anchored hearing aid device, it is rather difficult to arrange multiple plate piezo elements within an actuator which must fit into a bone anchored hearing aid device having strict size constraints. The present disclosure provides an actuator for a bone anchored hearing aid device having multiple plate piezo elements with a minimal size increase of the bone anchored hearing aid device when comparing to an actuator including a single plate piezo element.

Furthermore, another constraint to the bone anchored hearing aid device is the power consumption. Currently power is supplied analog to the actuator or plate piezo element, which results in a movement of the transducer and a force output. Provided multiple plate piezo elements requires more advanced energy transfer algorithms for lowering the power consumption of the bone anchored hearing aid device. The present disclosure can advantageously improve the power consumption of the bone anchored hearing aid device when including multiple plate piezo elements for increasing the frequency range of the vibrations.

In particular, the bone anchored hearing aid device unit and the method of operating a bone anchored hearing device unit disclosed herewith allow for energy harvesting at the undesired frequencies of the force output of the first plate piezo element. This can be done, e.g., by placing the second plate piezo element onto the inside of a bottom housing part of the implant. This can be realized with more than a first and a second plate piezo element. In particular, a third plate piezo element, and/or a fourth plate piezo element can be provided, wherein the second, the third and the fourth plate piezo element are configured with respective resonance frequency is in the range of the undesired high force output of the first plate piezo element.

The clamp system can connect the first plate piezo element and the second plate piezo element. The second plate piezo element (e.g., calibration piezo element) can be arranged on the bottom of the housing, underneath the first plate piezo element (e.g., force output creating piezo element).

In certain examples a clamp system is used. The clamp system can be adapted to (e.g. configured to) transfer a dynamic force between the first plate piezo element and the second plate piezo element. For example, the clamp system can be adapted to (e.g. configured to) transfer a dynamic force between the first plate piezo element and the second plate piezo element via the housing.

The clamp system can be configured to connect the first plate piezo element and the second plate piezo element at a single position. The clamp system can be configured to connect the first plate piezo element and the second plate piezo element at a multiple positions. For example, the clamp system is configured to clamp the first plate piezo element at a single position and contact the second plate piezo element in a single position. For example, the clamp system is configured to clamp the first plate piezo element at multiple positions and contact the second plate piezo element in multiple positions.

The clamp system may be configured to transfer a force output from the first plate piezo element, or from at least one plate piezo element producing a force output, to the housing or to at least a part of the housing of the bone anchored hearing aid device unit, in particular to the housing of the implant unit, so that the force output can then be transferred to the bone of the patient wearing the bone anchored hearing aid device unit. The second or multiple additional plate piezo elements may be arranged to be in contact with the housing or with the same housing part as the one in contact with the clamp system. Thus, the second or multiple additional plate piezo elements can detect a force output transferred from the first plate piezo element via the clamp system to the housing. The contact between the second or multiple additional plate piezo elements and the housing may be realized by gluing the second or multiple additional plate piezo elements to the housing, or, alternatively, by attaching the second or multiple additional plate piezo elements to the housing with a second clamp system. By gluing the second or multiple additional plate piezo elements to the housing, in particular to a bottom housing part of the implant unit, the implant unit can be size optimized.

The dimensions of the second or multiple additional plate piezo elements, in particular the length of the second or multiple additional plate piezo elements may be adapted to a targeted amount of energy to be harvested. In particular, the length of the second or multiple additional plate piezo elements may be chosen in dependence on a target resonance frequency of vibration. In a n example, the dimensions of the second or multiple additional plate piezo elements may be smaller than the dimensions of the first plate piezo element.

It can also be considered to provide a plurality of plate piezo elements that are used for producing a force output from a voltage signal. Alternatively or additionally, it can be considered to provide a plurality of plate piezo elements that are used for producing a voltage signal corresponding to a detected force output of the plurality of plate piezo element that are used for producing a force output from a voltage signal.

Variations of the bone anchored hearing aid device unit are described in the following, wherein the individual features may be combined with each other.

The bone anchored hearing aid device unit may be an implant unit configured to be implanted subcutaneously into a patient.

Alternatively, the bone anchored hearing aid device unit may be a percutaneous bone anchored hearing aid device.

The bone anchored hearing aid device unit may be provided in a manner, wherein the first plate piezo element is configured for producing a dynamic force output when excited by a voltage, and wherein the second plate piezo element is configured for receiving a dynamic force output produced by the first plate piezo element and for producing a voltage signal corresponding to the received dynamic force output produced by the first plate piezo element.

As an example, the first plate piezo element is configured to create a force output at a certain frequency, and the created force output is transferred to the housing of the bone anchored hearing aid device unit via, e.g., a clamp system attaching the first plate piezo element to the housing. The second plate piezo element may be in contact with the housing and configured to detect the force output transferred from the first piezo plate element to the housing and convert the detected force output into electric energy or voltage, thus harvesting energy from the force output of the first plate piezo element.

The energy converted from the fore output by the second plate piezo element is then either used to measure the output of the first plate piezo element or—with resonance adjustment by the harvesting, second plate piezo element—to remove undesired force output energy and feed that adjusted energy or voltage back into the electrical part of the system.

The piezoelectric effect is an electromechanical effect, that is working in both directions. While the piezoelectric effect is used at the first plate piezo element to create force output by applying voltage, the second plate piezo element uses the piezoelectric effect to measure force output and create a voltage signal corresponding to the force output of the first plate piezo element. With this signal, the system can be optimized. The software amplification for different frequencies can be adjusted to obtain optimum efficiency, thus performing a calibration loop comprising the first plate piezo element and the second plate piezo element.

In particular, the amount of charge needed in the first plate piezo element for generating a force output can be estimated and calculated to optimize the amount of charge put into the first plate piezo element. The estimation can take a characteristic of the second or multiple additional plate piezo elements into account, e.g., a correlation between a mechanical excitation and an electrical response to this mechanical excitation. Such characteristics can be already known ante-production of the bone anchored hearing aid device unit. With the second or multiple additional plate piezo elements, a force output—which can be expressed as force over frequency—of the first plate piezo element can be detected, and a corresponding electric signal or voltage can be created. Using the known correlation between a mechanical excitation and an electrical response, in particular when the correlation is a linear relation, the electric voltage generated by the second or multiple additional plate piezo elements can be used as a measure for the force output of the first plate piezo element. This measure can then be used for adjusting the feeding voltage signal for the first plate piezo element to a target force output. In particular, the second or multiple additional plate piezo elements may be provided in a calibration of control loop for controlling the first plate piezo element.

As an example, at the production line of the bone anchored hearing aid device unit, a frequency sweep can be performed at a fixed voltage, the force output of the first plate piezo element be measured, e.g., using a skull simulator, and the output voltage at the second plate piezo element can be measured. Using the collected data, correlations can be calculated and then stored for a control program as calibration data for the bone anchored hearing aid device unit. Postproduction, whenever the bone anchored hearing aid device unit is in use, the calibration data can be used for checking whether the force output of the first plate piezo element is as desired and for adjusting the audio signal that is sent to the first plate piezo element accordingly. Additionally or alternatively, the calibration data can be used for modifying the control of the first plate piezo element for compensation of degradation over time.

The bone anchored hearing aid device unit may be provided in a manner, wherein the second plate piezo element is configured for detecting dynamic force output of the first plate piezo element within a high frequency range of the frequency spectrum, and for outputting a voltage signal corresponding to the detected dynamic force output at high frequencies within the high frequency range. High frequency can be understood as a frequency range of 7 kHz or above. In certain situations, high frequency can be understood as a frequency range of 10 kHz or above. For example, high frequency can be seen as a frequency range of 7 to 10 kHz. The frequency spectrum can be understood as the general spectrum of frequencies.

The bone anchored hearing aid device unit may be provided in a manner, wherein the second plate piezo element is configured for detecting dynamic force output of the first plate piezo element within a high frequency range, and for outputting a voltage signal corresponding to the detected dynamic force output at high frequencies.

The bone anchored hearing aid device unit may be provided in a manner, wherein the second plate piezo element is configured for detecting dynamic force output of the first plate piezo element within a frequency range of 7 to 10 kHz, and for outputting a voltage signal corresponding to the detected dynamic force output at a frequency range of 7 to 10 kHz.

Accordingly, a self-calibration of the actuator can be achieved even at high frequency range of vibrational force output of the first plate piezo element.

The second plate piezo element may be attached to the housing of the bone anchored hearing aid device unit, in particular by gluing or using a second clamp system. Preferably, the second plate piezo element has a resonance frequency comprised in a frequency range of 7 to 10 kHz.

At the same time, the voltage signal outputted or harvested by the second plate piezo element can be used for electrical consumption of other elements of the bone anchored hearing aid device unit, resulting in an optimized overall electrical consumption of the bone anchored hearing aid device unit. In particular, the voltage signal outputted by the second plate piezo element can be used as input voltage for the first plate piezo element.

The second plate piezo element may be provided with dimensions, in particular a length and a width, chosen for the second plate piezo element to have a resonance frequency comprised in the range 7 to 10 kHz. The second plate piezo element may be provided to have a resonance frequency equal to an undesired frequency peak. Accordingly, the second plate piezo element is configured to extract energy from the vibrations of the housing at that frequency and convert the extracted energy into a voltage or electric energy.

By providing a second plate piezo element, or a plurality of plate piezo elements configured for producing a voltage signal corresponding to a detected force output of the first plate piezo element, which is optimized for high frequencies, the force output exceeding the need of the patient can be harvested and reversed into electrical energy to reduce external energy consumption.

The bone anchored hearing aid device unit may be provided in a manner, wherein the housing has an upper housing part and a bottom housing part, wherein the upper housing part and the bottom housing part form a receiving space for hosting the actuator, wherein the clamp system is configured for attaching the first plate piezo element of the actuator to the bottom housing part.

A design of the housing with separable part, wherein the actuator is attached to one of the housing parts allows for a more comfortable mounting or demounting of the bone anchored hearing aid device unit, while the actuator and in particular the plate piezo elements stay in place.

The bone anchored hearing aid device unit may be provided in a manner, wherein the clamp system is attached to the housing, wherein the clamp system is configured for clamping the first plate piezo element, and wherein the clamp system is in contact with the second plate piezo element.

The contact between the clamp system and the second plate piezo element allows for a transfer, at least in part, of the force output of the first plate piezo element to the second plate piezo element. The contact between the clamp system and the second plate piezo element may be a single point of contact. The contact between the clamp system and the second plate piezo element may be at multiple points of contact.

The actuator may be provided with multiple first plate piezo elements configured for producing a dynamic force output from a voltage signal input.

It has been found in the frame of the present disclosure that more than one plate piezo element can be used to create resonant frequencies at different frequency ranges. By having several plate piezo elements in parallel on a joint base/or next to each other without a mutual base, multiple resonance frequencies can be obtained. Multiple resonance peaks can be generated, resulting in a wider frequency range with high output and high-power efficiency. This can be achieved by having different lengths and the same mass on the elements or by having equal lengths and different masses of respective counterweights. The latter case is equivalent to using the same spring geometrical design but using different materials to have different spring coefficients. Alternatively or additionally, the same effect can be achieved with e.g., two plate piezo elements, wherein the plate piezo elements have different length and/or materials.

If there is enough space, multiple plate piezo elements (5, 10, 20 etc.) may be placed resulting in resonance frequency for each plate piezo element. The benefit with this is that the sum of all resonance peaks results in a force output curve may be designed for optimal vibration transmission (e.g., less prominent, and spiky resonance peaks, broader high F0 frequency range).

The bone anchored hearing aid device unit may be provided in a manner, wherein the clamp system is configured for transferring a dynamic force from the first plate piezo element to the housing, wherein a third plate piezo element is attached to the housing, and wherein the housing is configured for transferring the dynamic force from the first plate piezo element to the third plate piezo element.

The same multiple piezo approach as for generating force output can be applied for harvesting purposes. With a plurality of plate piezo elements arranged on the inside bottom of the housing of the bone anchored hearing aid device unit, the harvested voltage signal can be adjusted, e.g., for optimizing system force output and energy harvesting. The second plate piezo element and the third plate piezo element of the plurality of plate piezo elements can be different in shape (length, width) and/or material to adjust their energy harvesting properties.

The method of operating a bone anchored hearing device unit may further comprise: (d) calibrating parameter values of the first plate piezo element using the voltage signal.

The calibration may be performed by a processor of the bone anchored hearing aid device unit, which receives the voltage signal outputted by the second plate piezo element and adjust parameter values for commanding the function of the first plate piezo element.

Accordingly, the calibration of the first plate piezo element can be optimized based on the actual output of the first plate piezo element, measured live by means of the second plate piezo element. This method allows for a better force output without external intervention.

As already described above, at the production of the bone anchored hearing aid device unit, a frequency sweep may be performed, wherein a feeding signal is applied at the force output generating piezo with a frequency varying over the range 100-10000 Hz at a fixed voltage. In an example, the excited first plate piezo element is attached to the housing of the bone anchored hearing aid device unit by means of the clamp system and the force output generated by the first plate piezo element is transferred to the housing via the clamp system. A second plate piezo element being provided in contact with the housing is excited by the force output of the first plate piezo element via the housing. Preferably, the housing to which the force output of the first plate piezo element has been transferred is in contact the skull bone of a patient. In the production, the skull bone is emulated by means of a skull simulator. With the skull simulator, the force output that would be transferred to the skull of the patient is measured. By doing so, both the voltage outputted by the second plate piezo element and the information about the force output that would be transferred to the skull are known. In a calibration process in the production or during used of the bone anchored hearing aid device unit, the voltage outputted by the second plate piezo element may be used for adapting the control of the first plate piezo element, thus adjusting the force output that is aimed to be transferred to the skull of the patient. In particular, such a calibration or adjustment may be used for transferring a flatter output to the skull, whereas the output to the skull may have a frequency comprised in the range 5 to 10 kHz, preferably in the range 7 to 10 kHz.

The method of operating a bone anchored hearing device unit may further comprise: (e) using the voltage signal outputted by the second plate piezo element for supplying energy to the first plate piezo element.

In an example, the second plate piezo element has a resonance frequency comprised in the range of 5 to 10 kHz, particularly in the range 7 to 10 kHz. When the second plate piezo element is in contact with a housing part of the bone anchored hearing aid device unit to which a force output of the first plate piezo element is transferred, the second plate piezo element draws vibration/force output energy from the housing part and transforms it into electrical charge/voltage. That voltage can then be feed back into the electrical system of the bone anchored hearing aid device unit in real time.

This allows for avoiding complex signal processing, and, at the same time, for eliminating, by means of the second plate piezo element, unnecessary frequencies of frequency ranges from the force output transferred to the skull of the patient wearing the bone anchored hearing aid device unit.

Also, the overall electrical consumption of the bone anchored hearing aid device unit can be optimized, which is, at least due to the dimension and weight constrains imposed to a bone anchored hearing aid device unit, a significant improvement.

The electronic hardware of the bone anchored hearing aid device may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc.

Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

A bone anchored hearing aid device typically comprises an external unit and an implant unit.

When the bone anchored hearing aid device is a percutaneous bone anchored hearing aid device, the external unit typically includes i) an input unit such as a microphone for receiving an acoustic signal from a user's surroundings and providing a corresponding input audio signal, and/or ii) a receiving unit for electronically receiving an input audio signal.

The external unit may further include a signal processing unit (such as the sound processor) for processing the input audio signal. The signal processing unit may include an amplifier that is adapted to apply a frequency dependent gain to the input audio signal. The signal processing unit may further be adapted to provide other relevant functionality such as compression, noise reduction, etc.

Moreover, the external unit may comprise an output unit including an output transducer such as an actuator for providing a structure-borne acoustic signal based on the processed input audio signal. The actuator could also be attached to a soft band, headband or neck band. External units of bone anchored hearing aid devices typically use an actuator/transducer technology to vibrate sound into the skull of a patient based on variable reluctance.

The external unit may comprise an abutment configured to be connected to the implant unit, the implant unit being configured to be fixated in a skull of a user. The implant may comprise an osseo-integrated screw in the skull, in particular in the temporal bone of the user. The vibrations produced by the actuator of the external unit are transferred to the implant unit via the abutment.

When the bone anchored hearing aid device is a transcutaneous bone anchored hearing aid device, the external unit typically includes the input unit and the signal processing unit, but the output transducer/actuator is arranged within the implant unit, and the external unit does not comprise an abutment but a communication unit to provide inductively the processed input audio signal to the implant.

A computer program (product) comprising instructions which, when the program is executed by a computer, cause the computer to carry out the method of operating a bone anchored hearing device unit described above.

In an aspect, the functions may be stored on or encoded as one or more instructions or code on a tangible computer-readable medium. The computer readable medium includes computer storage media adapted to store a computer program comprising program codes, which when run on a processing system causes the data processing system to perform at least some (such as a majority or all) of the steps of the method described above, in the and in the claims.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. In addition to being stored on a tangible medium, the computer program can also be transmitted via a transmission medium such as a wired or wireless link or a network, e.g., the Internet, and loaded into a data processing system for being executed at a location different from that of the tangible medium.

In an aspect, a data processing system comprising a processor adapted to execute the computer program for causing the processor to perform at least some (such as a majority or all) of the steps of the method described above.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e., to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element, but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure, or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more.

Accordingly, the scope should be judged in terms of the claims that follow.

Further features and advantages of the bone anchored hearing aid device unit and the method of operating a bone anchored hearing device unit emerge from the following description of exemplary embodiments where reference is made to the attached drawing.

BRIEF DESCRIPTION OF THE DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

FIG. 1*a* to 1*c* show different examples of a bone anchored hearing aid device;

FIG. 2*a* is a schematic representation of an actuator of a bone anchored hearing aid device according to an exemplary embodiment of the invention;

DETAILED DESCRIPTION OF THE DRAWINGS

Figure 2B:
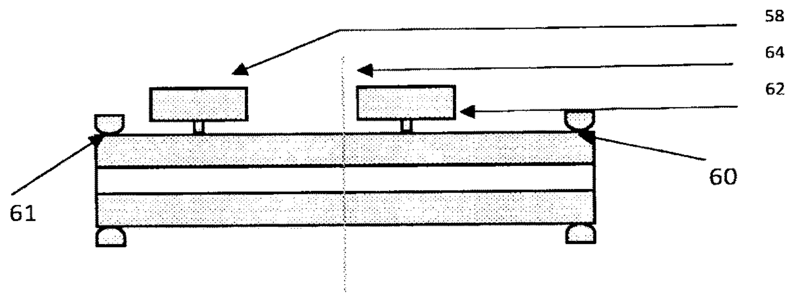
FIG. 2*b* is a schematic representation of an actuator of a bone anchored hearing aid device according to an exemplary embodiment of the invention with two counterweights.

FIG. 1*a* to 1*c* illustrate different examples of a bone anchored hearing aid device 1 configured to apply a main vibration 2 onto a skull 4 of a recipient of the bone anchored hearing aid device 1. FIG. 1*a* illustrates an example where the bone anchored hearing aid device 1 is a transcutaneous bone anchored hearing aid device 1 including an external unit 57 configured to be arranged above the skin 6, and an implant unit, configured to be arranged under the skin 6. The implant unit includes a first housing 50 and a second housing 51 which are connected by at least one or more wires 55. In another example the connection may be wireless, or the implant unit comprises only one housing. The first housing 50 includes an actuator 10, and the second housing 51 includes a coil 54 configured to communicate 56 inductively and through the skin 6 and to the external unit 57. The second housing 51 includes a magnet apparatus 52 configured to attract the external unit 57. In this example, a processing unit 30 is arranged within the external unit 57. The processing unit is configured to control the actuator 10 and the communication 56 which includes power to activate the actuator 10. The communication 56 may include information and/or power. The communication 56 may be bidirectional including information and/or power. In FIG. 1*b*, which shows an example of a percutaneous bone anchored hearing aid device, the actuator 10 and the processing unit 30 are arranged within the first housing 50 and are connected via one or more wires 55. In this example, the hearing aid 1 is arranged on the skin 6, and the vibration 2 is transferred to the skull 4 via the first housing 50. In FIG. 1*c*, which shows another example of a percutaneous bone anchored hearing aid device, the first housing 50 is connected to the skull 4 via an implant screw 58, and in this example the vibration 2 is transferred to the skull via the implant screw 58.

FIG. 2*a* shows an actuator 56 of a bone anchored hearing aid device according to an exemplary embodiment of the invention, which correspond for example the actuator 10 of FIG. 1*a*. The actuator 56 has a plate piezo element 57 and a counterweight 58. Also shown is a clamp system 59*a*, 59*b*, wherein the clamp system 59*a*, 59*b* is configured for attaching the actuator 56 or part of the actuator to the housing of the unit, e.g., the first housing 50 of the implant unit of FIG. 1*a*, or the first housing 50 of the external unit of FIG. 1*b* or 1*c*. The clamp system 59*a*, 59*b* clamps the plate piezo element 57 of the actuator at a first clamp position 60 and at a second clamp position 61. Further, the counterweight 58 is arranged on one side of the plate piezo element 57 and is substantially centered with respect to the first clamp position 60 and the second clamp position 61.

FIG. 2*b* shows an actuator 56 with a first counterweight 58 and with a second counterweight 62. The first counterweight 58 is arranged at a shorter distance to the second clamp position 61 in comparison to the distance between the first counterweight 58 and the geometrical center 64 of the side of the plate piezo element. The second counterweight 62 is arranged at a greater distance from the he geometrical center 64 of the side of the plate piezo element in comparison to the distance between the second counterweight 62 and the first clamp position 60.

Figure 3:
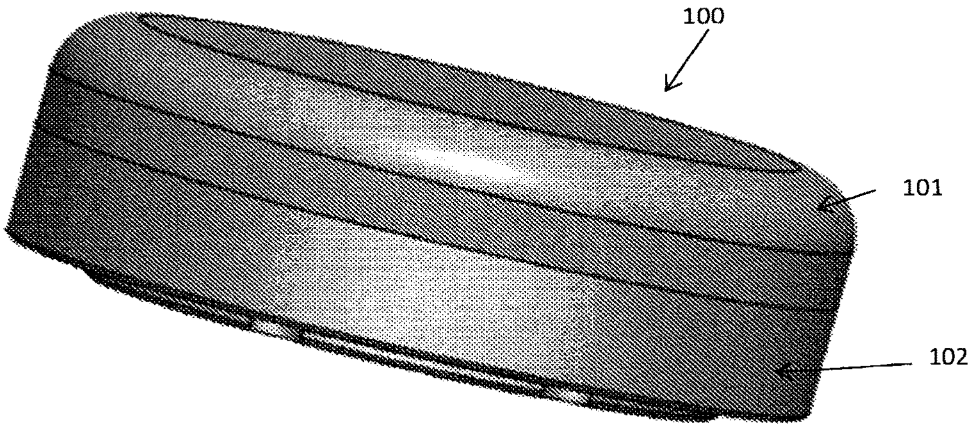
FIG. 3 shows a housing of a bone anchored hearing aid device unit according to an exemplary embodiment of the invention.

FIG. 3 shows a housing of a bone anchored hearing aid device unit 100 according to an exemplary embodiment of the invention, provided with an upper housing part 101 and a bottom housing part 102, the upper housing part 101 and the bottom housing part 102 being configured to connect via a screw connection.

Figure 4:
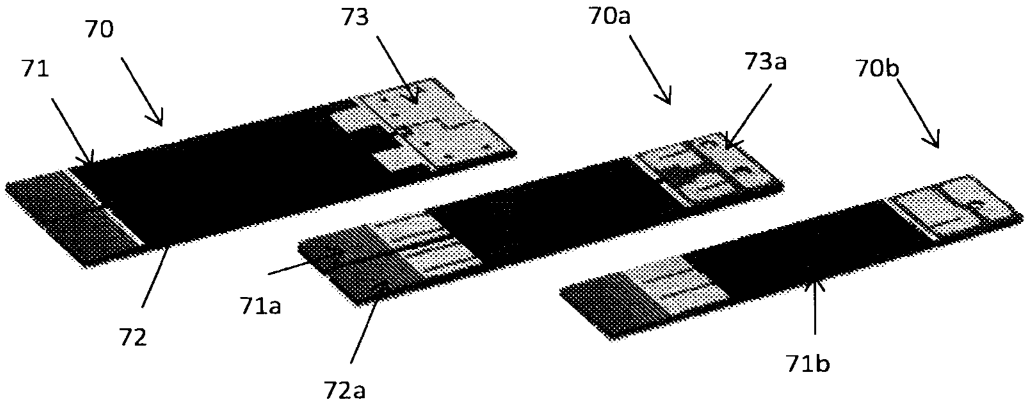
FIG. 4 shows several constellations of combined piezo plate elements or a single plate piezo element of the bone anchored hearing aid device unit according to an exemplary embodiment of the invention.

FIG. 4 shows three piezo plate elements 70, 70*a* and 70*b* for an actuator of a bone anchored hearing aid device according to an exemplary embodiment of the invention. The plate piezo element 70 has a first plate piezo 71 and a second plate piezo 72, the first plate piezo 71 and the second plate piezo 72 being provided with a joint base and in parallel 73. The first plate piezo 71 and the second plate piezo 72 have substantially similar lengths and each of the first plate piezo 71 and the second plate piezo 72 are respectively provided with different total weights of counterweight (not shown). Accordingly, the piezo plate element 70 has multiple resonance frequencies achieved by the different weight on each "arm" 71, 72 of the plate piezo element.

Element 70*a* also has a first plate piezo element 71*a* and a second plate piezo element 72*a*, the first plate piezo element 71*a* and the second plate piezo element 72*a* being provided with a joint base 73*a* and in parallel. The first plate piezo element 71*a* and the second plate piezo element 72*a* have different piezo-electromechanical properties and are respectively provided with similar total weights of counterweight (not shown).

Element 70*b* has a single piezo plate element 71*b*. The bases 73 and 73*a* are metallic contraction points.

The plate piezo elements 70, 70*a* and 70*b* can be provided as first plate piezo element or as second plate piezo element in the meaning of the present invention. By choosing the material and configuration of each of the first plate piezo element and of the second plate piezo element, e.g., with multiple "arms", respectively, energy can be outputted or harvested with corresponding resonance frequencies. This can be particularly advantageous for adapting the harvested energy for a feeding back into the electrical system of the bone anchored hearing aid device unit afterwards.

Figure 5:
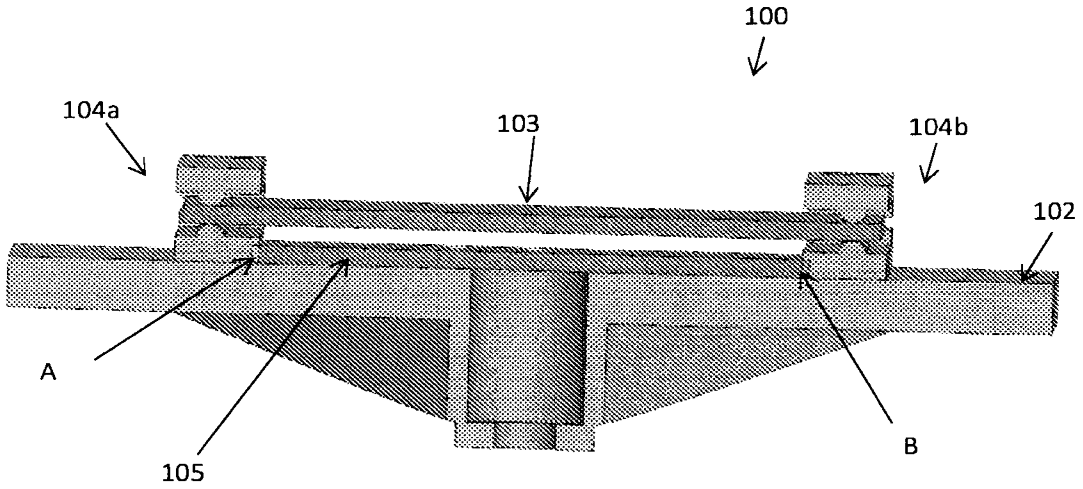
FIG. 5 shows a diagram of a force output of several piezo plate elements of the bone anchored hearing aid device unit according to an exemplary embodiment of the invention.

FIG. 5 shows parts of a bone anchored hearing aid device unit 100 comprising a bottom housing part 102 and an actuator having a first plate piezo element 103, and a clamp system 104*a*, 104*b* configured for attaching the first plate piezo element 103 to the housing 101. The actuator 102 has a second plate piezo element 105 arranged on the inside of the bottom housing part 102. The clamp system 104*a*, 104*b* connects the first plate piezo element 103 and the second plate piezo element 105. The second plate piezo element 105 (calibration piezo element) is arranged on the bottom of the housing 101, underneath the first plate piezo element 103 (force output creating piezo element).

Further, the clamp system 104*a*, 104*b* is adapted for transferring a dynamic force between the first plate piezo element 103 and the second plate piezo element 105. The clamp system 104*a*, 104*b* can be configured for transferring a dynamic force between the first plate piezo element 103 and the second plate piezo element 105. In FIG. 5, the clamp system 104*a*, 104*b* is in direct contact with the second plate piezo element at the position A and B, and also in indirect contact with the second plate piezo element 105 via the bottom housing part 102. The indirect contact is realized through the clamp system 104*a*, 104*b* being attached to the bottom housing part 102 and the second plate piezo element 105 being attached to the bottom housing part 102 as well.

Figure 6:
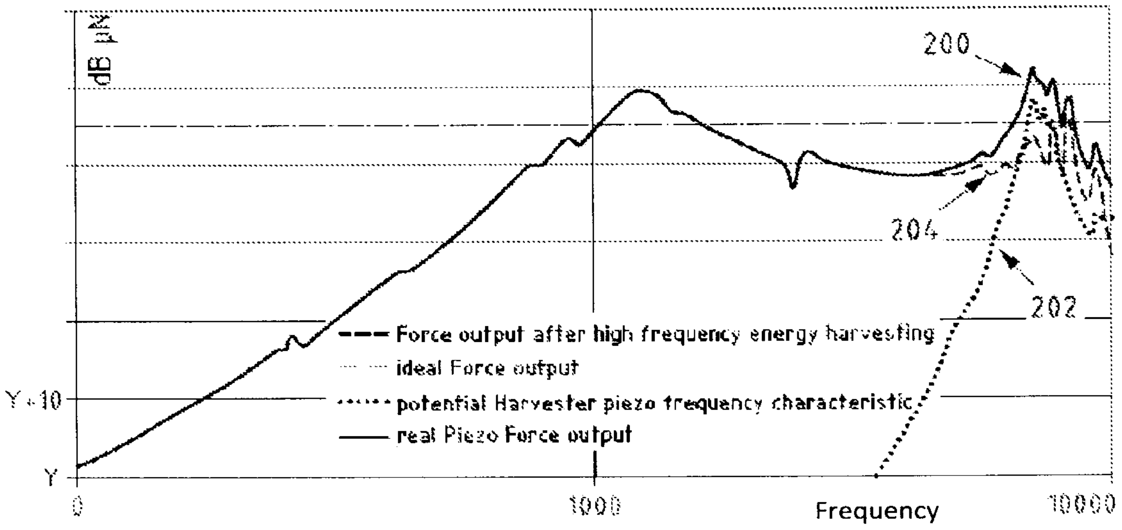
FIG. 6 shows a diagram of a force output of a bone anchored hearing aid device unit according to an exemplary embodiment of the invention.

FIG. 6 shows a force output diagram for bone anchored hearing aid device units, wherein Y is depending on input voltage and material and is usually between 50 and 100 dB. A curve 200 corresponds to the force output of bone anchored hearing aid device unit with a first plate piezo element and not second plate piezo element, i.e., without force output harvesting. A curve 202 shows a force output only of a second plate piezo element of a bone anchored hearing aid device unit provided with a first and with a second plate piezo element. A curve 204 corresponds to the overall force output of bone anchored hearing aid device unit having a first and a second plate piezo element. In comparison with curve 200, curve 204 shows that the overall force output is reduced at high frequencies by an amount corresponding to the force output harvested by the second plate element (see curve 202).

Accordingly, the energy collected by the second plate piezo element (harvesting piezo element, curve 202) can be recycled into the electrical system of the bone anchored hearing aid device units. The user will experience a more equal response of the system independent frequency and the software adjustment of the force output can significantly be reduced.

The invention claimed is:

1. Bone anchored hearing aid device unit comprising:
- a housing,
- an actuator having a first plate piezo element, and
- a clamp system configured for attaching the first plate piezo element to the housing, wherein:
- the actuator has a second plate piezo element,
- the clamp system connects the first plate piezo element and the second plate piezo element via the housing,
- the clamp system is configured to transfer, via the housing, a dynamic force between the first plate piezo element and the second plate piezo element, and
- calibration of parameters for controlling the first plate piezo element is performed based on a voltage signal output by the second plate piezo element.

2. Bone anchored hearing aid device unit according to claim 1,
- wherein the bone anchored hearing aid device unit is an implant unit configured to be implanted subcutaneously into a patient.

3. Bone anchored hearing aid device unit according to claim 1,
- wherein the first plate piezo element is configured for producing a dynamic force output when excited by a voltage, and
- wherein the second plate piezo element is configured for receiving a dynamic force output produced by the first plate piezo element and for producing a voltage signal corresponding to the received dynamic force output produced by the first plate piezo element.

4. Bone anchored hearing aid device unit according to claim 3,
- wherein the second plate piezo element is configured for detecting dynamic force output of the first plate piezo element within a high frequency range of the frequency spectrum, and for outputting a voltage signal corresponding to the detected dynamic force output at high frequencies within the high frequency range.

5. Bone anchored hearing aid device unit according to claim 1, wherein the housing has an upper housing part and a bottom housing part,
- wherein the upper housing part and the bottom housing part form a receiving space for hosting the actuator,
- wherein the clamp system is configured for attaching the first plate piezo element of the actuator to the bottom housing part.

6. Bone anchored hearing aid device unit according to claim 1,
- wherein the clamp system is configured for clamping the first plate piezo element, and
- wherein the clamp system is in contact with the second plate piezo element.

7. Bone anchored hearing aid device unit according to claim 1, wherein the clamp system is configured for transferring a dynamic force from the first plate piezo element to the housing,
- wherein a third plate piezo element is attached to the housing, and
- wherein the housing is configured for transferring the dynamic force from the first plate piezo element to the third plate piezo element.

8. A method of operating a bone anchored hearing device unit, the method comprising:
- (a) providing a bone anchored hearing aid device unit according to claim 1,
- (b) feeding a first plate piezo element with a voltage so that the first plate piezo element produces a dynamic force output;
- (c) detecting, by the second plate piezo element, the dynamic force output of the first plate piezo element and outputting a voltage signal corresponding to the detected dynamic force output; and
- (d) calibrating parameters of the first plate piezo element based on the voltage signal output by the second plate piezo element.

9. Method of operating a bone anchored hearing device unit according to claim 8, further comprising:
- (e) using the voltage signal outputted by the second plate piezo element for supplying energy to the first plate piezo element.

* * * * *